United States Patent [19]

Binarsch et al.

[11] Patent Number: 4,720,810
[45] Date of Patent: Jan. 19, 1988

[54] ELECTRONIC CONTROL ARRANGEMENT FOR CONTROLLING A PLURALITY OF OUTPUTS IN ACCORDANCE WITH THE ELECTRICAL STATE OF A PLURALITY OF INPUTS

[75] Inventors: Jurgen Binarsch, Haste; Dietmar Meyer, Barsinghausen, both of Fed. Rep. of Germany

[73] Assignee: WABCO Westinghouse Fahrzeugbremsen GmbH, Hanover, Fed. Rep. of Germany

[21] Appl. No.: 502,406

[22] Filed: Jun. 8, 1983

[30] Foreign Application Priority Data

Jun. 23, 1982 [DE] Fed. Rep. of Germany ....... 3223383

[51] Int. Cl.⁴ ............................................. G06F 15/20
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 4,254,462 | 5/1981 | Raymond et al. | 364/200 |
| 4,266,281 | 5/1981 | Struger et al. | 364/900 |
| 4,405,981 | 9/1983 | Yu et al. | 364/200 |
| 4,419,756 | 12/1983 | Cheng et al. | 364/900 |
| 4,482,953 | 11/1984 | Burke | 364/200 |

OTHER PUBLICATIONS

Zilog Data Book, 1982/1983, pp. 30–40.

Primary Examiner—Thomas M. Heckler
Attorney, Agent, or Firm—J. B. Sotak

[57] ABSTRACT

An electronic control arrangement including a plurality of inputs and outputs, whereby the outputs are controlled in relationship with the inputs according to a predetermined program. Additionally, the outputs are coupled to another input by way of a special-function line. When the control is switched on, the external wiring is called upon to supply information regarding the state of certain controllable circuit elements. Through this, the electronic control circuit automatically checks which one of the several stored programs is appropriate under the circumstance.

3 Claims, 2 Drawing Figures

ELECTRONIC CONTROL ARRANGEMENT FOR CONTROLLING A PLURALITY OF OUTPUTS IN ACCORDANCE WITH THE ELECTRICAL STATE OF A PLURALITY OF INPUTS

FIELD OF THE INVENTION

This invention relates to a unique electronic control arrangement, and more particularly, to an electronic control circuit having a plurality of inputs for controlling a plurality of outputs which results in the selection of an appropriate one of a number of computer programs for initiating suitable instructions and/or performing certain tasks in accordance with the electrical state of a number of output elements.

BACKGROUND OF THE INVENTION

It will be appreciated that electronic control circuits especially microcomputers have the task of controlling several outputs in relationship to the voltage values at several inputs in accordance with a predetermined program. Heretofore, for example, control-keying-devices, terminal switches, or pickup devices were responsive to temperature and pressure are connected to the inputs. The output elements, such as, signal lamps, relays, timing circuits, or magnetic valves were connected to the outputs.

In connection with a specific area of application, such as, door control apparatus for buses and trains, it is necessary to take into consideration the numerous special demands of the traffic related industry. These are the different operating and functioning phases, additional blinkers, various numbers and types of doors, special alarm systems, among other things. Each type of door control demands a specific program for the microcomputer of the door control circuit. In order to satisfy these demands, up to now various types of electronic controls were utilized.

It is, for instance, possible to construct a universal electronic control circuit and equip it with a plug-in storage program unit or with a coding switch to set different programs. But, such a solution is too expensive if a large number of devices shall be produced.

The subject invention is based on the task of developing an electronic control of the aforementioned type which can be utilized for diversified special functions without additional extraneous logic-switching, such as, relays, pressure switches and delay circuits. Hereby, no switching of the control device shall be necessary for the respective request regarding special functions.

This problem is solved in the invention by providing an electronic control arrangement having a plurality of inputs and a plurality of outputs whereby the condition of the outputs is controlled in accordance with the condition of the inputs and whereby a control circuit sequentially interrogates the outputs in one-by-one fashion or in a serial order during a start-up test period. The outputs are coupled to a special-function line. The special-function line is connected to an additional input of the control circuit and the control circuit selects an appropriate stored program in accordance with the output signals on the special-function line. A significant advantage of the invention is contained in the fact that the electronic control system analyses the respective electrical state of the outputs and selects the corresponding given program. These outputs are connected to electrical elements which form the various external circuits. However, there can also be special diodes connected to the outputs for coding purposes.

DESCRIPTION OF THE PRESENTLY PREFERRED EMBODIMENT

Figure 1:
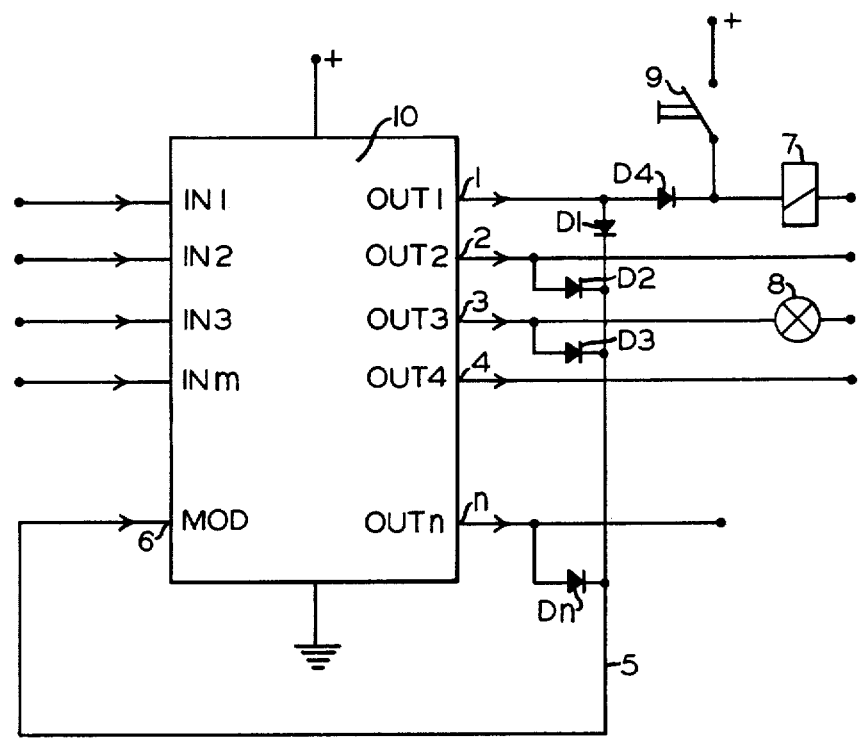
FIG. 1 is a schematic circuit diagram of the electronic control system in accordance with the present invention.

Referring now to the drawings and, in particular, to FIG. 1, there is illustrated a control system employing a multiple-programmed microcomputer circuit which includes a number of inputs to control a number of outputs and which contains proper programs for various vehicle door control applications. Referring to the drawing, there is shown the electronic control arrangement having a control circuit 10 which contains a suitable IC microprocessor, for example, an 8749 microcomputer manufactured by Intel, as well as a program memory which includes computer programs for all types of variations or applications that can occur in a door control operation for buses or trains.

The control circuit 10 includes a plurality of inputs IN1 through INm as well as a plurality of outputs OUT1 through OUTn. As noted above, the inputs IN1 through INm are connected to control devices, terminal switches or pickup devices which are responsive to temperature or pressure while the outputs OUT1 through OUT4 are connected to signal lamps, relays, timing circuits or magnetic valves so that the inputs and outputs may be either in a low or high condition, namely, a binary "0" or binary "1". The outputs OUT1 through OUTn are connected to a special-function line 5 via isolation or decoupling diodes D1 through Dn. This special-function line 5 is connected to an additional input 6 MOD of the control circuit 10. The MOD input is any input of the microcomputer that can be interrogated by the program.

When the door control operation is started up, the microcomputer initially interrogates the outputs OUT1 through OUTn successively. At first the output OUT1 is activated. Via the diode D1 and line 5 an impulse is fed to the input (MOD). After that the output OUT2 is activated with the same result. The same result also is obtained for the output OUT3. When the output OUT4 is activated, there is no impulse fed to the input (MOD) since the output OUT4 has no diode. After running this procedure up to the output OUTn the microcomputer 10 is capable of determining where the doides are and are not. The computer is now able to choose the appropriate program for that given coding. Due to this test run, the control determines which of the specific external elements, such as, a relay 7 or a signal lamp 8, are connected in the circuit. In addition, the diodes D1 through Dn may be replaced by coding resistors or capacitors in the control circuit.

Figure 2:
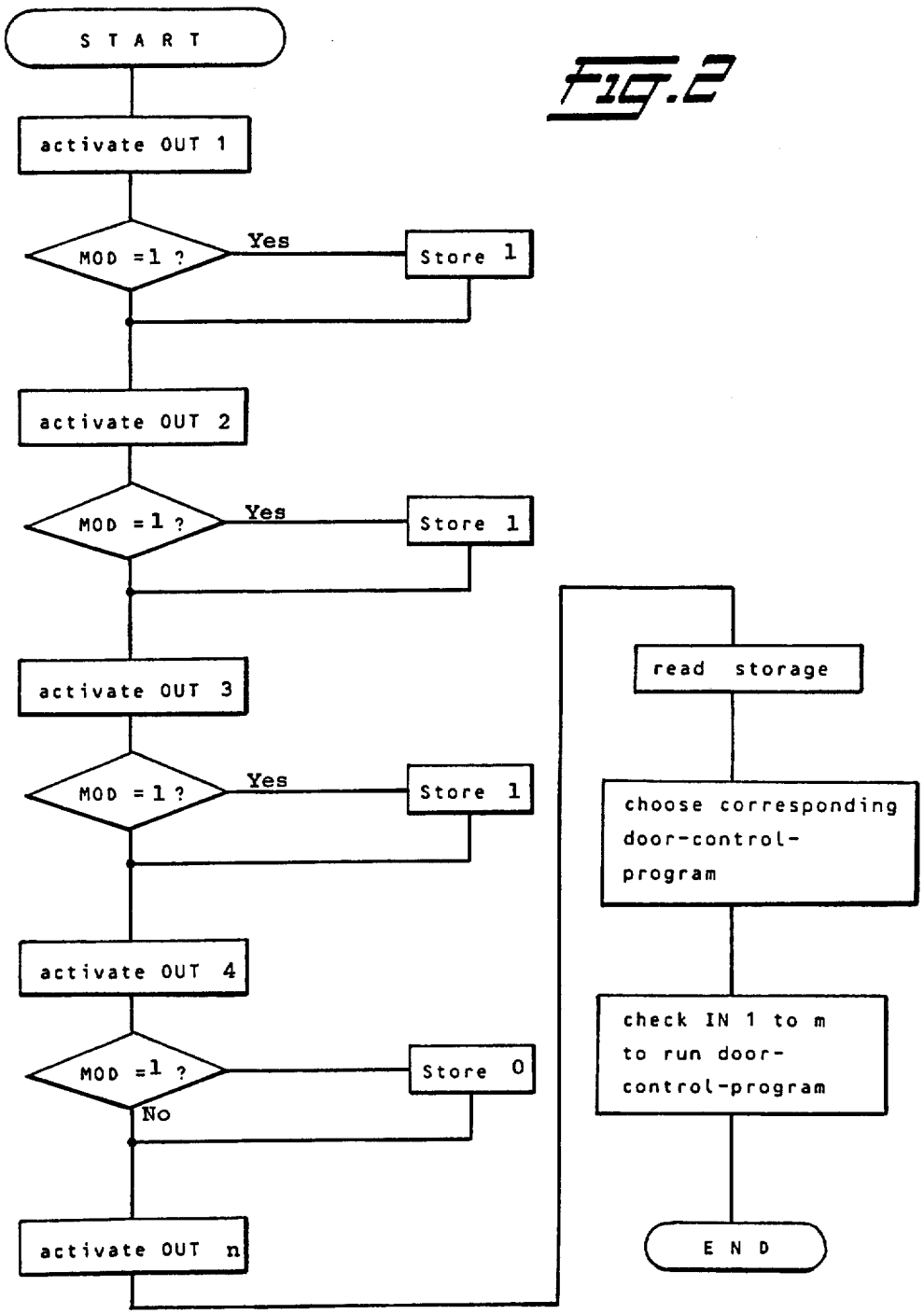
FIG. 2 is a flow chart diagram which illustrates the general operations or process steps undertaken by the system of FIG. 1.

Referring to the various functional components of FIG. 2, there is shown a typical flow chart on which the operation of the microprocessor may be based. The operation is initiated or started by the closing of the switch 9 which provides supply voltage to control circuit of FIG. 1. Thus, the application of power initiates the sequence of operation which is self-explanatory to one skilled in the art when viewing the flow chart of FIG. 2.

Based on the results of the test, the appropriate program is selected; that is, certain control steps of the function of the door-control are skipped, inserted, or otherwise carried out in accordance with the electrical state of the outputs.

With regard to an n number of outputs which are coded by means of the diodes, there are a maximum number of $2^n$ various possible program variants.

If an output can be activated by an output signal, as for example, the output OUT1 can be activated by closure of a push-button switch 9, then it is necessary to block this signal by means of an additional diode D4.

In an effort to determine disturbances during the test and consequently avoiding an incorrect functional operation, it is first determined if a faulty active signal exists on the input MOD and whether the outputs are all activated and are not being forced to a zero signal by a short circuit.

Besides coupling the special-function line 5 through diodes, it is also possible to provide coupling through resistors and/or capacitors (not shown), whereby the number of program variants can be increased by inserting different values of utilization of diversified resistances and capacitances.

The control, according to the invention, is not only applicable for door controls but may be utilized in other systems as well.

Having now described the invention, what we claim as new and desire to secure by Letters Patent, is:

1. An electronic control arrangement having a plurality of inputs and a plurality of outputs whereby the condition of the outputs is controlled in accordance with the electrical state of the inputs and whereby the electrical state of the outputs controls the electrical state of certain external electrical elements comprising,
    (a) a control circuit for sequentially interrogating the plurality of outputs in one-by-one serial fashion during an initial start-up test period,
    (b) the sequentially interrogated outputs are coupled to a special-function line,
    (c) the special-function line is connected to an additional input of the control circuit for receiving the sequentially interrogated outputs, and
    (d) the control circuit selects an appropriate one of several stored programs in accordance with the electrical states of the sequentially interrogated outputs delivered by the output of the special-function line to the additional input of the control circuit.

2. The electronic control arrangement, as defined in claim 1, wherein the plurality of outputs are coupled to the special-function line via a plurality of diodes.

3. The electronic control arrangement, as defined in claim 1, wherein the control circuit is a microprocessor.

* * * * *